May 9, 1939.  W. J. COULTAS ET AL  2,157,691
WHEEL
Filed Aug. 8, 1935
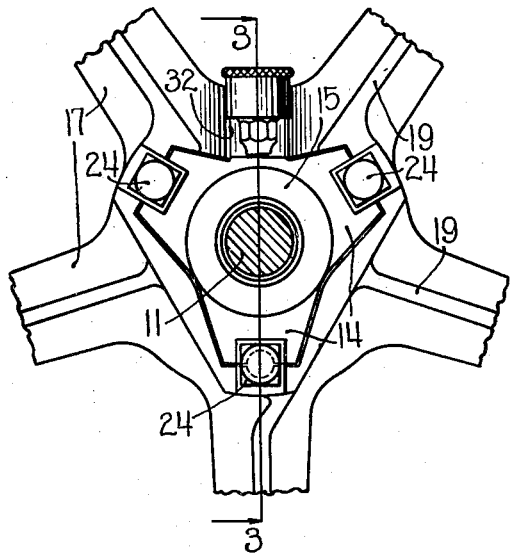
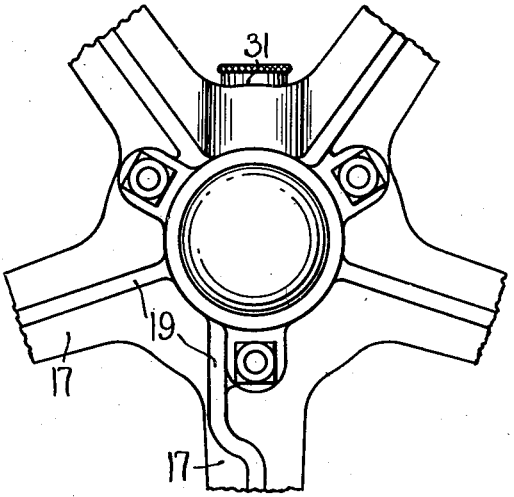
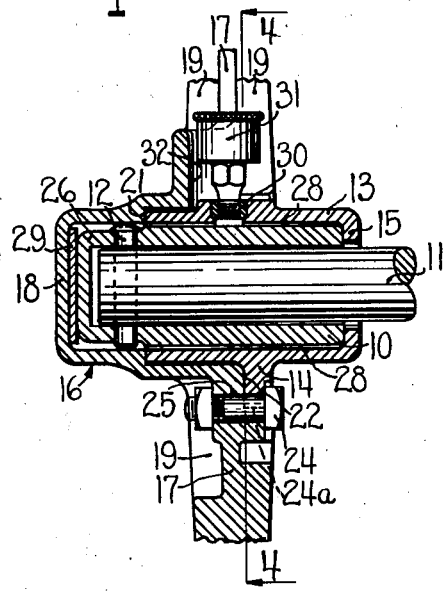
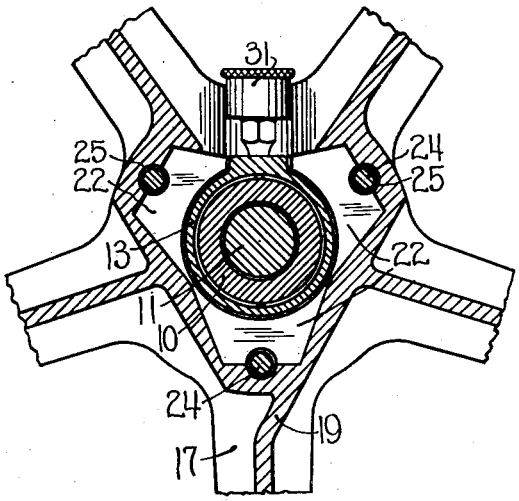
INVENTORS.
BY Wilbur J. Coultas and Norman T. Andrews.
Brown, Jackson, Boettcher & Dienner
ATTORNEYS.

Patented May 9, 1939

2,157,691

UNITED STATES PATENT OFFICE 2,157,691

WHEEL

Wilbur J. Coultas and Norman F. Andrews, Moline, Ill., assignors to Deere & Company, Moline, Ill., a corporation of Illinois Application August 8, 1935, Serial No. 35,231

4 Claims. (Cl. 308—110)

The present invention relates to wheels adapted to be used on vehicles of various types including farming implements, and has more particularly to do with the hub and bearing assemblies thereof.

As is well known, the bearing members of the wheels of plows and other farm implements used in the field are subject to wear more rapidly than other parts of the wheels or of the implement owing to the fact that sand and other grit works into such bearing members, and it has therefore been customary to provide such wheels with hub and bearing assemblies that could be replaced when necessary.

With the above in view it is the principal object of the present invention to provide a wheel and bearing assembly therefor in which the wearing parts may be easily and quickly replaced when necessary with a minimum amount of labor and expense.

Other objects and advantageous features of the present invention will appear from the following description of the preferred embodiment of our invention as illustrated in the accompanying drawing, in which:

Figure 1 is a view of the inner side of the hub and bearing assembly of a wheel equipped with our improvements;

Figure 2 is a view of the outer side of the hub and bearing assembly of the wheel;

Figure 3 is a vertical cross-sectional view taken on the plane of the line 3—3 of Figure 1; and Figure 4 is a vertical cross-sectional view taken on the plane of the line 4—4 of Figure 3.

In the drawing only such parts of the wheel have been illustrated as are necessary to an understanding of our invention, and as therein shown the improved hub and bearing assembly comprises a suitable wear sleeve 10 preferably in the form of a casting having its outer surface chilled to increase its wearing quality, said sleeve being removably mounted on the outer end of a vehicle axle 11 upon which the wheel is to be mounted. The sleeve 10 is fixed to the axle by means of a pin 12 which passes through alined openings in the sleeve 10 and in the axle 11 adjacent the outer end thereof as shown in Figure 3.

The outer end of the axle with the sleeve 10 mounted thereon receives a suitable bearing member 13 comprising a cylindrical body portion provided substantially intermediate its length with a plurality of integrally formed lugs 14 extending radially therefrom for connecting said bearing member to the hub portion of the wheel as will be hereinafter described. In order to furnish a high degree of wearing quality, the bearing member 13 is preferably in the form of a white iron casting or of other metal having a relatively high carbon content. The inner end of the bearing member 13 (the right hand end as viewed in Figure 3) is provided with an inwardly directed or radially extending annular shoulder 15, and the inner end of the sleeve 10 is adapted to bear against the inner side of this annular shoulder 15 as shown.

The hub of the wheel is indicated by the reference numeral 16, and as shown it is provided with a plurality of radially extending spokes 17 and a hub cap 18. The wheel illustrated is in the form of an iron casting, and the hub, spokes and hub cap are formed integrally therewith, but this construction may be varied without departing from the spirit of our invention. For instance, the spokes may be separately formed and secured to the hub in any suitable manner, as may also be the hub cap, as will be readily understood. Also, the wheel may be of the disc type as well as of the spoke type, as the type of wheel in this respect has nothing to do with the invention. In the illustrated construction the spokes 17 of the wheel have been shown as being reenforced by radially extending ribs 19 cast integral therewith.

The outer end of the bearing member 13, the left hand end in Figure 3, is inserted in the hub 16, and on its interior the hub is provided with a shoulder 21 which serves as a seat for the outer end of the bearing member 13. Suitable recesses 22 are formed in the inner face of the wheel extending radially from the axle receiving opening in the hub, as best shown in Figure 4, for receiving the radially extending lugs 14 of the bearing member 13. While in the illustrated construction the bearing member 13 has been shown as provided with three of such lugs adapted to seat in three recesses 22 formed in the wheel, it is to be understood that any number of such lugs and recesses therefor may be provided as is deemed desirable.

The bearing member 13 is detachably secured to the hub 16 by means of a plurality of bolts 24 disposed in semi-circular recesses 24a formed in the outer ends of the radially extending lugs 14 and extending through openings 25 provided in the hub 16 in alinement with said recesses, as shown in Figures 3 and 4.

As shown at 26 in Figure 3, the outer end of the sleeve 10 that is enclosed by the hub cap 18 is slightly reduced in diameter to provide clearance between the inner wall of the hub cap and the outer wall of the sleeve. If desired, however, the interior recess in the hub cap section 18 could be made slightly larger than the outside diameter of the bearing sleeve 10. This clearance, while providing for accommodating the head and end of the pin 12, also provides a recess for the passage of lubricant around the end of the sleeve 10, lubricant distributing grooves 28 usually being provided on the inner surface of the bearing member 13. A floating washer 29 or other suitable means for the purpose may be inserted in the space between the end of the sleeve 10 and the inner surface of the hub cap 18 as shown in order to further limit the endwise movement of the sleeve 10 if that should be deemed desirable. It is, however, advantageous to have a certain amount of play between the outer end of the sleeve 10 and the inner surface of the hub cap 18 since any tendency for the sleeve to move longitudinally within the bearing member 13 applies pressure on the lubricant contained in the recess between the outer end of the sleeve and the inner wall of the hub cap and thereby forces the lubricant between the bearing surfaces of the sleeve and bearing member, which is of course desirable.

A suitable bushing 30 is cast in the bearing member 13 and a lubricant fitting in the form of a grease cup 31 is threaded into said bushing, whereby suitable lubricant may be supplied to the bearing assembly, as will be readily understood. The hub of the wheel is provided with a recess 32 to accommodate the grease cup 31 carried by the bearing member 13.

We claim:

1. A wheel comprising a hollow hub section, a replaceable cylindrical bearing member adapted to be removably disposed within said hollow hub section, means detachably connecting the bearing member to said hub, a lubricant fitting carried by said bearing member for delivering lubricant into the interior thereof and removable therewith, and a recess formed in said hub exteriorly of said bearing member for accommodating said lubricant fitting.

2. A wheel comprising a hollow hub section having a plurality of laterally facing recesses, a replaceable cylindrical bearing member adapted to be removaby disposed within said hollow hub section and having a plurality of integral radially extending lugs adapted to be disposed in said recesses in close fitting relation, means detachably holding said bearing member in said hub with the lugs in said recesses, a lubricant fitting carried by said bearing member, and a fitting receiving recess formed in said hub between two of said first mentioned recesses for accommodating said lubricant fitting, the latter being removable with said bearing member from said hub.

3. A wheel for the axle of an agricultural implement or the like, comprising a sleeve adapted to be mounted on the end of and fixed against rotation with respect to said axle, the outer end of said sleeve being closed so as to protect the end of the axle against wear, a hollow wheel hub section having a plurality of laterally facing recesses, a replaceable cylindrical bearing member journaled for rotation on said sleeve and removably disposed within said hollow wheel hub section and having a plurality of radially extending lugs adapted to be disposed in said laterally facing recesses in close fitting relation, said wheel hub having a part spaced from said axle and bearing against the outer end of said sleeve for limiting endwise movement of said bearing member relative to said sleeve and to relieve said axle of wear incident thereto, means extending parallel to the axis of rotation of said wheel for detachably holding said lugs in said laterally facing recesses, a lubricant fitting carried by said bearing member for directing lubricant into the space between said sleeve and said bearing member, and a fitting receiving recess formed in said hub for accommodating said lubricant fitting, the latter being removable with said bearing member when the latter is detached from said hub.

4. A wheel for the axle of an agricultural implement or the like, comprising a sleeve adapted to be mounted on the end of and fixed against rotation with respect to said axle, the outer end of said sleeve being closed so as to protect the end of the axle against wear, a hollow wheel hub section, a replaceable cylindrical bearing member journaled for rotation on said sleeve and removably disposed within said hollow wheel hub section, said wheel hub having a part spaced from said axle and bearing against the outer end of said sleeve for limiting endwise movement of said bearing member relative to said sleeve and to relieve said axle of wear incident thereto, means for detachably holding said bearing member in said hollow wheel hub section, a lubricant fitting carried by said bearing member for directing lubricant into the space between said sleeve and said bearing member, and a fitting receiving recess formed in said hub for accommodating said lubricant fitting, the latter being removable with said bearing member when the latter is detached from said hub.

WILBUR J. COULTAS.
NORMAN F. ANDREWS.